United States Patent [19]

Hasselbacher et al.

[11] 4,307,917
[45] Dec. 29, 1981

[54] PARKING BRAKE SYSTEM

[75] Inventors: Roland E. Hasselbacher; Lucien B. Shuler, both of Bettendorf, Iowa

[73] Assignee: Caterpillar Tractor Co., Peoria, Ill.

[21] Appl. No.: 149,353

[22] PCT Filed: Feb. 4, 1980

[86] PCT No.: PCT/US80/00123
§ 371 Date: Feb. 4, 1980
§ 102(e) Date: Feb. 4, 1980

[87] PCT Pub. No.: WO81/02274
PCT Pub. Date: Aug. 20, 1981

[51] Int. Cl.³ .............................................. B60T 13/22
[52] U.S. Cl. ..................... 303/71; 188/352; 303/10
[58] Field of Search .................. 303/71, 50–56, 303/13, 2–3, 10–12, 9, 68, 84, 6 A, 6 M; 188/170, 352; 192/4 R, 4 A

[56] References Cited

U.S. PATENT DOCUMENTS

| | | | |
|---|---|---|---|
| 3,272,566 | 9/1966 | Clack | 303/13 |
| 3,841,714 | 10/1974 | Schultz | 303/71 |
| 3,932,003 | 1/1976 | McGregor | 303/68 |
| 3,954,304 | 5/1976 | Engle | 303/13 |

OTHER PUBLICATIONS

"Design Concepts of the New John Deere JD750/755 Dual Path Hydrostatic Crawler Tractors", Society of Automotive Engineers, Earthmoving Industry Conference, Central Illinois Section, Peoria, Illinois, Apr. 26–28, 1976, C. L. Braun, John Deere Dubuque Works.

*Primary Examiner*—Douglas C. Butler
*Attorney, Agent, or Firm*—Phillips, Moore, Weissenberger, Lempio & Majestic

[57] ABSTRACT

A brake system for a vehicle having spring applied, pressure releasable brakes (10) including a manual pump (28), a terminal board (14) having ports (16,18,20) terminating the system fluid pressure line (22), the brake pressure line (12) and the pump pressure line (76), and a U-tube (120) connecting two of the ports on the terminal board. In the alternative embodiment, an emergency brake release system for a vehicle having spring applied, pressure releasable brake (130) including a pump (166), and a control valve (140) for selectively connecting the pump (166) to the brakes (130) while connecting the fluid pressure supply line (133) to a reservoir return line (136). The valve (140) includes modes for connecting the brakes (130) to the supply line (134) through an orifice (192), and a brake outlet line (138) to the reservoir return line (136) for bleeding the brakes (130), and for isolating the supply line (134) while venting the brake line (133), for checking system pressure. A limit switch (200) prevents engine starting while the brakes (130) are manually released.

20 Claims, 8 Drawing Figures

PARKING BRAKE SYSTEM

DESCRIPTION

1. Technical Field

This invention relates to brake apparatus, and more particularly, to a hydraulic brake apparatus for a vehicle which is able to provide a variety of brake apparatus conditions.

2. Background Art

When a hydraulic system failure occurs or when the engine is not running to drive the pump for the brake system in vehicles having spring-applied, pressure-release brakes, the brakes are spring-applied by the failure or loss of such vehicle hydraulic pressure. When such failure or loss occurs, a vehicle of this type cannot be towed to a suitable repair station until the brake cylinders are again pressurized to provide release of the brakes.

Accordingly, it is necessary and conventional to provide a means of independently pressuring the brake cylinders for release thereof when system hydraulic pressure fails or is lost by connecting a manual pump to the brake system.

Additionally, it is necessary from time to time to bleed the system by bleeding out the hydraulic brake system to purge air therefrom. It is therefore desirable to provide a hydraulic brake apparatus that will facilitate bleeding of the brake system when required.

In addition to the above, vehicle hydraulic systems usually provide application of system fluid pressure to a transmission for operation thereof, along with application of such fluid pressure to the brakes to provide release of the brakes. It is therefore desirable to provide for checking system fluid pressure by isolating the brake system from fluid pressure applied to the transmission, to provide a check of the operation of such transmission. Such a system would insure that the brakes are applied while isolated from system pressure when the transmission is being checked.

The present invention is directed to overcoming one or more of the problems as set forth above.

DISCLOSURE OF INVENTION

In the preferred embodiment of this invention a terminal board is provided having ports in communication with the vehicle fluid pressure supply line, the brake pressure supply line, and a manual pump line which communicates with the vehicle hydraulic reservoir. A manual fluid pump is disposed in the manual pump line and is shunted by a relief valve and a manual pressure release valve.

A U-tube is provided for manual coupling of the terminal board ports which allows selective communication of the vehicle fluid pressure line or manual pump line with the brake pressure supply line for normal or manual pressure release of the brakes.

Brake bleed lines are also connected to closable ports on the terminal board to facilitate bleeding of the brakes by means of the manual pump.

The brakes can be isolated from the vehicle hydraulic system for testing thereof by connecting the fluid pressure line through the manual pump line and relief valve to the reservoir.

An alternative embodiment is provided for changing the brake apparatus conditions by means of a valve instead of a terminal board and U-tube. In the alternative embodiment of this invention a valve is disposed in communication with a vehicle fluid pressure supply line, and a reservoir return line, and with the vehicle brakes. The valve normally communicates system fluid pressure to the brakes, and is movable to a position wherein fluid pressure may be applied from another fluid pressure source through the valve to the brakes. Also, the valve is movable to a position where brake lines of the systems may be bled in a highly efficient manner, and pressure may be selectively applied to the transmission while the brakes are in an applied, depressurized state, to provide a check of transmission fluid pressure.

BEST MODE OF CARRYING OUT THE INVENTION

Figure 1:
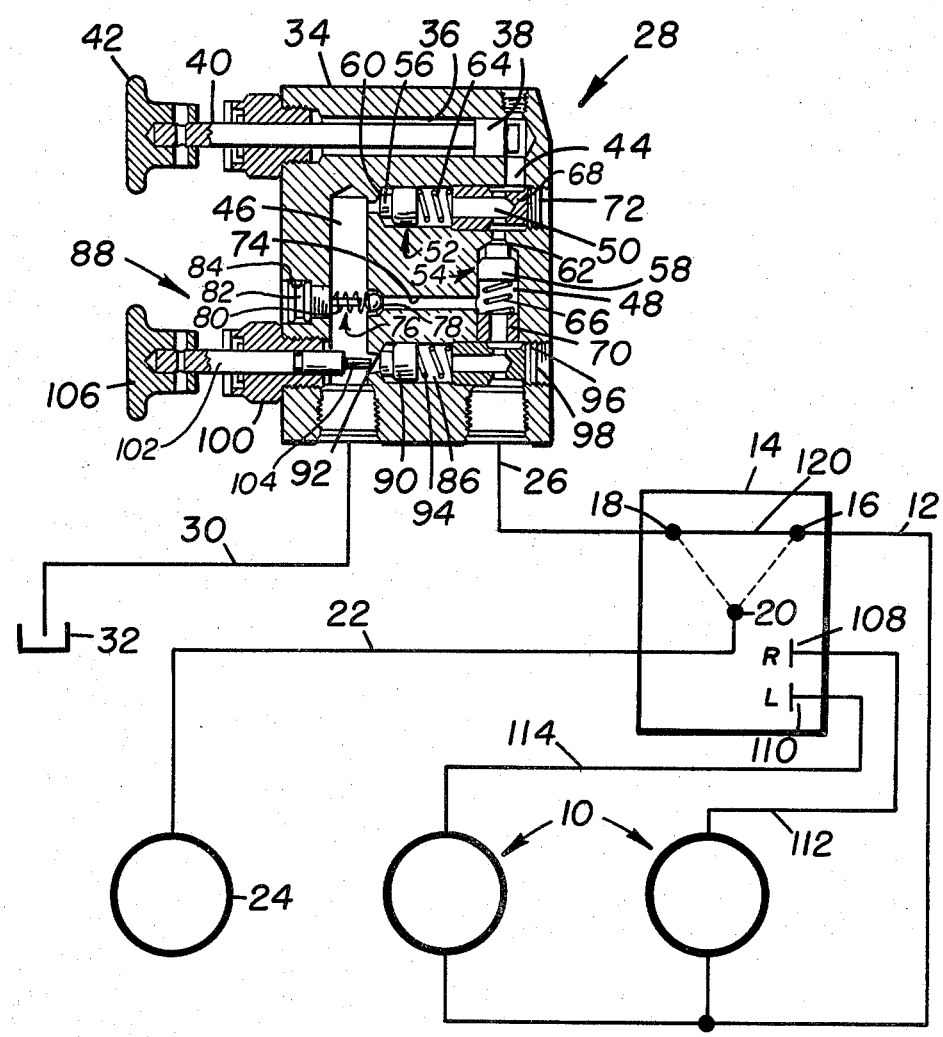
FIG. 1 is a schematic view of a system embodying the present invention.

Referring to FIG. 1, the brakes of a vehicle are shown generally at 10 connected hydraulically to a brake pressure line 12. The brakes are of the conventional type wherein application of pressure thereto through line 12 overcomes the spring force of biasing springs, not shown, to release the brakes, while release of pressure in line 12 allows the spring force of the biasing springs to apply the brakes.

A terminal board 14 is provided having ports 16, 18 and 20 provided therein. Brake pressure line 12 terminates at port 16 of the terminal board. A pressure supply line 22 terminates at port 20 of the terminal board and communicates with a vehicle hydraulic pressure source 24. A manual pump line 26 terminates at port 18 and communicates with a manual pump assembly shown generally at 28. A supply line 30 communicates the manual pump assembly with a hydraulic system fluid reservoir 32.

The manual pump assembly 28 includes a housing 34 having a pump cylinder 36, a piston 38 manually reciprocable within the cylinder by means of a rod 40 provided with a handle 42. Cylinder 36 is communicated by a passageway 44 which communicates with inlet and outlet passages 46 and 48 through a cross bore 50. A suction check valve 52 is provided in cross bore 50 and an outlet check valve 54 is provided in outlet passage 48 so that when pump rod 40 is manually reciprocated, fluid will be drawn in from reservoir 32 through supply line 30, inlet passage 46, suction check valve 52, cross bore 50, and passageway 44; and out through passageway 44, cross bore 50, outlet check valve 54, outlet passage 48 to manual pump line 26.

The check valves 52 and 54 comprise valve elements 56 and 58 which are slidable within bores 50 and 48 and are biased against seats 60 and 62 formed by narrowed end portions of bores 50 and 48, by springs 64 and 66 secured by retainers 68 and 70.

Retainer 68 is retained in bore 50 by a cap 72 which is threadably secured in the end of bore 50.

Also provided in housing 34 is a pressure relief passage 74 communicating inlet bore 46 and outlet bore 48, which has a pressure relief valve 76 provided therein. Relief valve 76 includes a valve element 78 which is seated against a necked down portion of passage 74, and is retained there by a relief pressure spring 80 which is retained and adjustably tensioned by a retainer 82 which is threadably disposed in a bore 84. Relief valve 76 limits the maximum pressure in the brakes 10 created by manual pump 28.

Also provided in housing 34 is a bore 86 which also communicates inlet bore 46 and outlet bore 48. A release valve assembly 88 is disposed in bore 86 to provide for releasing of fluid pressure to the fluid reservoir 32 to again apply the brakes after emergency towing has been completed. Valve assembly 88 includes a valve element 90 which is seated against a seat 92 formed by a necked down portion of bore 86. Element 90 is biased against seat 92 by a spring 94 retained by a retainer 96 secured in bore 86 by a cap 98. Retainer 96 also retains retainer 70 in outlet bore 48. A gland 100 is disposed in the end of housing 34 opposite element 90 and has a valve rod 102 slidable therein. The internal end of rod 102 has a finger 104 provided thereon and arranged to engage valve element 90. The external end is provided with a handle 106 so that rod 102 can be manually pushed inward to unseat valve element 90 and release any fluid pressure in line 26 to reservoir 32.

Terminal board 14 also has ports 108 and 110 which are the terminations of brake bleed lines 112 and 114, respectively. Ports 108 and 110 are normally closed as by threaded caps but may be opened by removing such caps for bleeding of the brakes.

A U-tube 120 is adapted to being coupled to two of ports 16, 18 and 20.

Figure 2:
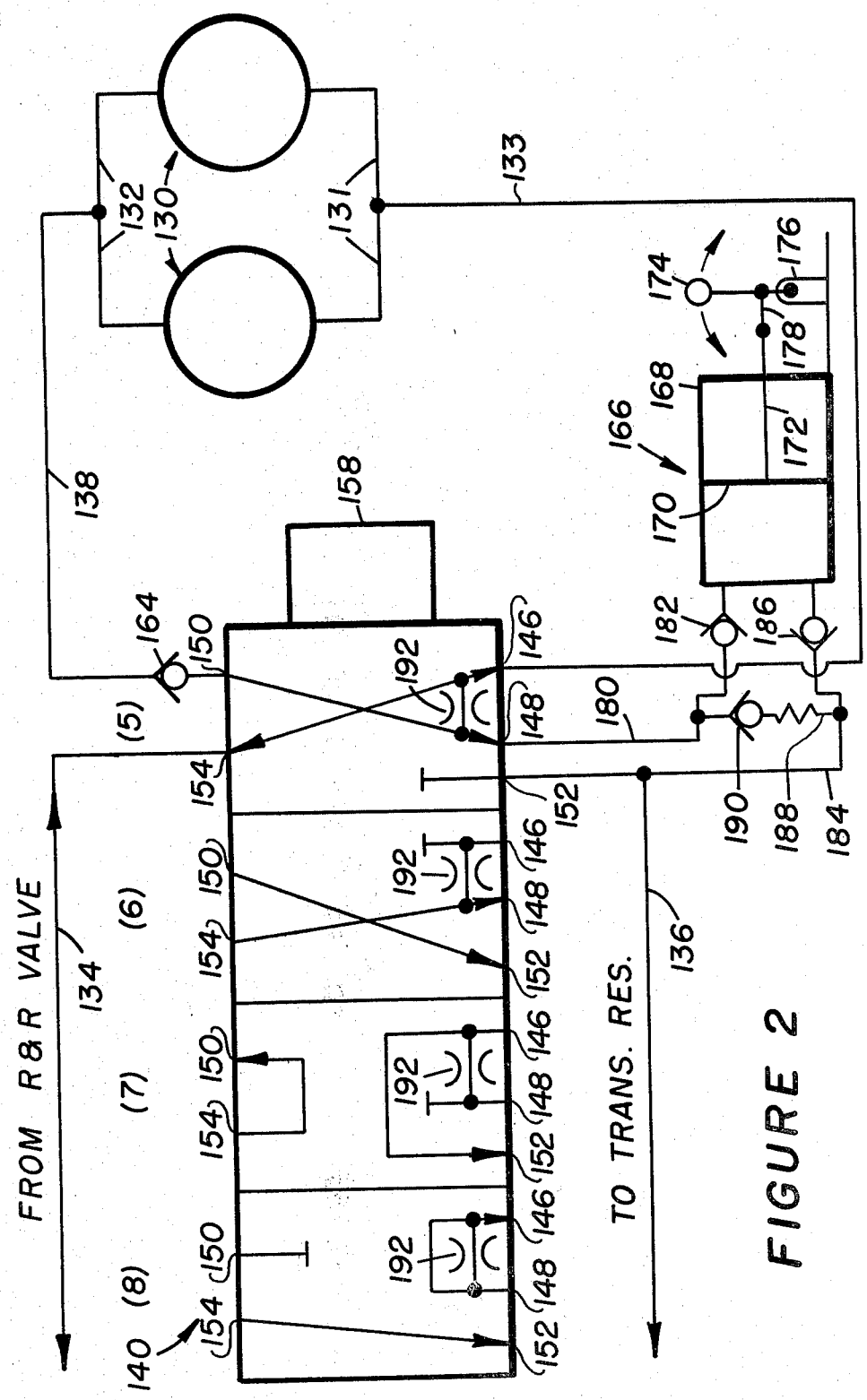
FIG. 2 is a schematic view of a system including an alternative embodiment of the present invention.

An alternative embodiment of the present invention is provided. Referring to FIG. 2, a vehicle system is shown which includes brakes 130 which include brake feed lines 131 and brake bleed lines 132 which are releasable by fluid pressure in a brake pressure line 133. The brake pressure line, a fluid pressure line 134, a reservoir return line 136 and a brake exhaust line 138 are all communicated with a valve shown generally at 140.

Figure 3:
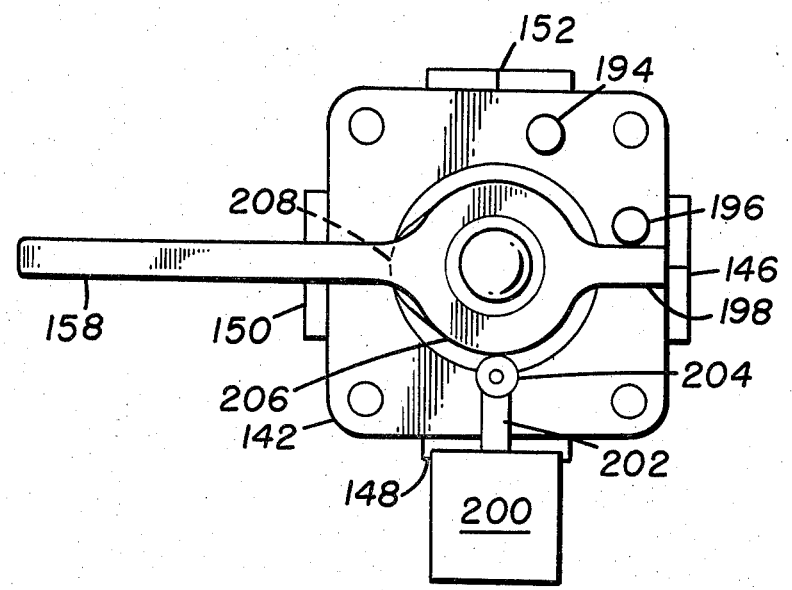
FIG. 3 is a plan view of the valve of the system of FIG. 2.
Figure 4:
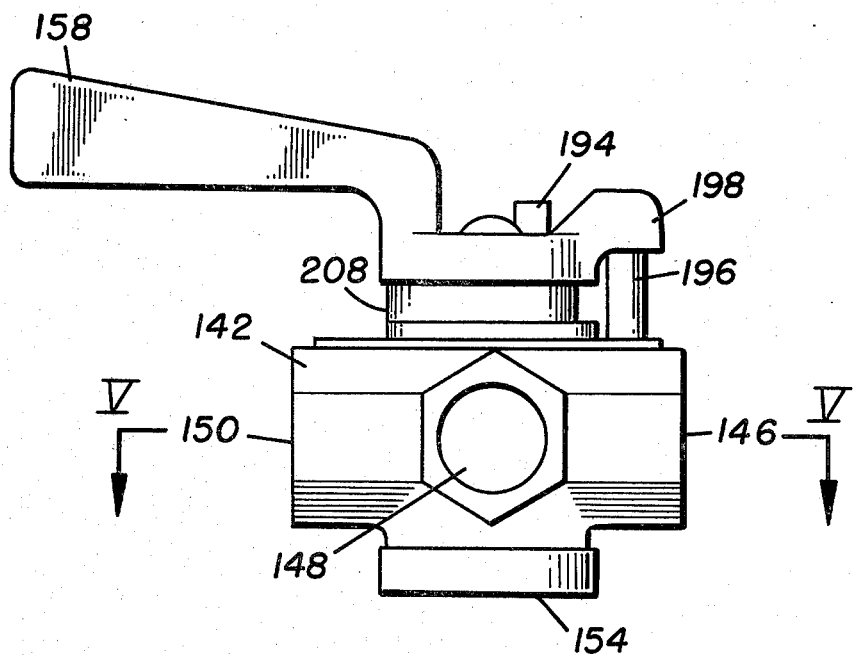
FIG. 4 is a side view of the valve of FIG. 3.

Referring to FIGS. 5–8, the valve 140 includes a valve body 142 having a central bore 144 and means defining four radial ports 146, 148, 150 and 152, and an axial port 154 (see FIG. 3). A valve element 156 is rotatable within valve body 142 and movable by means of a handle 158 affixed thereto (FIGS. 3 and 4).

Valve element 156 is provided with an angled passage 160 which communicates axial port 154 with one of the radial ports 146, 148, 150 or 152; and a peripheral passage 162 which communicates adjacent other of the radial ports 146, 148, 150, 152.

Referring to FIG. 2, the fluid pressure line 134 communicates pressurized hydraulic fluid from a replenish and relief valve of the vehicle hydraulic system (not shown) to axial port 154 of valve body 142. Brake pressure line 133 communicates radial port 146 with lines 131 and the brakes 130. Brake exhaust line 138 communicates brake bleed line 132 to port 150. Brakes 130 provide communication therethrough between feed lines 131 and bleed lines 132. Exhaust line 138 has a check valve 164 therein for blocking reverse flow therethrough from valve 140 to the exhaust side of brakes 130, but allowing flow in the opposite direction through line 138.

A manually actuated fluid pump is shown schematically at 166. The pump includes a cylinder 16 having a piston 170 reciprocally disposed therein, a connecting rod 172 affixed to piston 170 and extending from cylinder 168, and a lever 174 pivotally mounted on a frame 176 and connected to the extending end of the connecting rod 172 by a link 178. It will be understood that movement of the lever in the manner shown by the arrows in FIG. 2 causes piston 170 to move within cylinder 168.

A pump outlet line 180 communicates the cylinder head end of the pump cylinder 168 with port 148 of the valve body 142. The line 180 has a check valve 182 therein for allowing flow from the head end of the cylinder 168 to port 148, but blocking flow in a reverse direction. A pump feed line 184 communicates the head end of cylinder 168 with return line 136 and port 152 of valve body 142. Line 184 has a check valve 186 therein for allowing flow in the direction from line 136 to the cylinder head, but blocking flow in the opposite direction.

A shunt line 188 interconnects line 180 and line 184, and includes a spring-biased relief valve 190 therein which prevents over pressurizing of the brakes by the hand pump.

As depicted in FIGS. 2 and 5–8, valve body 142 includes a groove 192 provided adjacent valve element 156 between ports 146 and 148 to provide a restrictive orifice therebetween for purposes described hereinbelow.

Industrial Applicability

Under normal operation, U-tube 120 is connected between terminal board ports 16 and 20 so that fluid pressure line 22 is communicated to brake pressure line 12 for pressure release of the brakes. If there is no fluid pressure to the brakes or if there is a vehicle failure with a resultant failure of the hydraulic system pressure, the brakes will be applied by the brake springs. If it is desired to tow the vehicle to a repair facility, the U-tube is removed from port 20 and connected to port 18, thus communicating manual pump line 26 with brake pressure line 12. The brakes may then be pressurized for release thereof by manual reciprocation of handle 42 and rod 40, which pumps fluid to the brakes from reservoir 32 through check valves 52 and 54. When towing is completed and it is desired to again set the brakes by the release of the brake springs, handle 106 is depressed to open release valve 88 and exhaust brake pressure line fluid to reservoir 32.

With the U-tube connected between ports 16 and 18 the brakes 10 may be individually bled very effectively by opening ports 108 and 110 and pumping fluid through the brake system by means of the manual pump. Upon completion of the bleeding, ports 108 and 110 are closed and U-tube reconnected between ports 16 and 20.

If it is desired to check system pressure, the brakes may be isolated from the vehicle hydraulic system by connecting the U-tube between ports 18 and 20 insuring that the brakes are applied when the system pressure is being checked.

It will be understood that whenever U-tube 120 is connected between any two of ports 16, 18 and 20, the third port is closed by a cap (not shown).

The coupling of the U-tube and cap to the ports of the terminal board requires some tools and time in altering the mode of the vehicle. However, the apparatus of the present invention is intended for use for purposes and conditions when the vehicle is under the control of service personnel rather than operating personnel.

Such an arrangement prevents inadvertent change of the vehicle mode by an operator who may not be thoroughly familiar with abnormal vehicle equipment and operating modes. However, a system may be desired that facilitates operation by operating personnel without a requirement for tools or time in altering the vehicle mode.

Pins 194 and 196, shown in FIGS. 3 and 4, are disposed on valve body 142 to interfere with a projecting nose portion 198 of handle 158 to prevent rotation of handle 158 and valve element 156 from the normal mode directly to the brake release modes as will be described.

Valve body 142 has mounted thereon a limit switch 200 (FIG. 3) including a spring-biased arm 202 having a roller 204 mounted thereto in rolling contact with a cam surface 206 secured to handle 158. A lobe 208 of the cam surface 206 is positioned such that arm 202 is forced to retract when valve 140 is moved to the position shown in FIG. 8, whereby limit switch 200 is opened. Limit switch 200 is operatively connected with the engine of the vehicle so that when limit switch 200 is open, the vehicle engine cannot be started. In the remaining positions of handle 158, roller 204 is not on the lobe of cam surface 206, and the engine may be started.

Considering the alternative embodiment described, brakes 130 as shown are used for braking of a vehicle. With valve 140 as shown in FIGS. 2 and 3-5, axial port 154 communicates with port 146 through valve element 156, while port 150 communicates with port 148. Meanwhile, port 152 is blocked from communication. Application of fluid pressure to port 154 and through peripheral passage 162 communicates fluid pressure to port 146, and through line 133 and lines 131 to brakes 130 for pressure relief of the brakes. Since lines 131 are in communication with lines 132, respectively, fluid pressure is also applied through lines 132, through line 138, to port 150, then through valve element 156 to port 148, into line 180 and against the relief valve 190. The pressure setting of the relief valve is higher than the pressure from fluid pressure line 134 and that required to release the brake. Relief valve 190 effectively blocks the passage of fluid from the brakes 130 through line 180.

It will therefore be seen that brakes 130 may readily be released against the force of the springs thereof in the above-described manner. In order to apply brakes 130, pressure is released from line 134, allowing pressure release from brakes 130 in a manner opposite to that described above, and the springs of brakes 130 will then provide application thereof to brake the vehicle.

Figure 6:
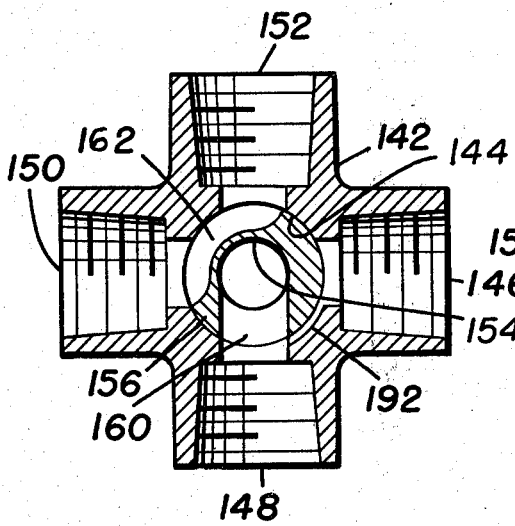
FIG. 6 is a view similar to that shown in FIG. 5, with the valve in a second operating mode.

If it is desired that brakes 130 of the vehicle be bled, the valve element is moved by means of handle 158 to the position shown in FIG. 6. This provides that portion 6 and shown in FIG. 2 is in the place of portion 5. Communication is then provided between axial port 154 and port 148 through the valve element. Communication is also provided between port 150 and port 152. Port 146 is blocked from communication; except, as noted above, such port communicates with port 148 through orifice 192. Fluid pressure is applied through line 134 and through valve element 156 to port 148, and through orifice 192 to port 146. The fluid pressure is then applied to line 133 and to the lines 131, through brakes 130, to lines 132 and line 138, past check valve 164 to port 150; then through the valve element to port 152, into return line 136 to the transmission reservoir. Orifice 192 allows a small amount of fluid flow to take place along the path just described, insuring that such flow is limited and regulated to provide that any air in the system is properly purged. Because of the pressure drop created by orifice 192, insufficient pressure is directed to the brakes for their release during the bleed mode. It will readily be seen therefore that a highly efficient and simple system of bleeding of the vehicle brake system is provided by the present invention.

Figure 7:
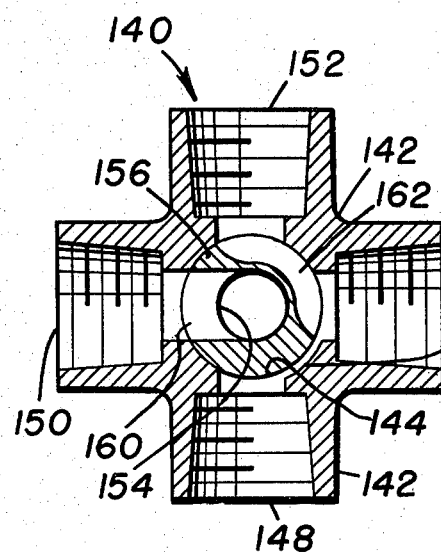
FIG. 7 is a view similar to that shown in FIGS. 5 and 6, with the valve in a different operating mode.

Again, during normal vehicle operation, valve element 156 may be moved to the position shown in FIG. 7, corresponding to a position in FIG. 2 wherein the portion 7 is moved into the position originally held by the portion 5. Valve element 156 thereby provides communication between port 154 and port 150, and also between port 146 and port 152, with port 148 being blocked. With the valve element in this position, communication is provided between line 133 and line 136 through valve element 156, so that lines 131 communicate with drain, releasing any fluid pressure on brakes 130. Thus, brakes 130 are in an applied state. Meanwhile, pressure may be built up in line 134 and maintained therein because of check valve 164 in line 138. This pressure buildup provides, in turn, pressure buildup in the transmission of the vehicle. It will thus be seen that the transmission may be tested in its pressurized state while pressure is released from brakes 130 to insure that they are in an applied state.

Figure 5:
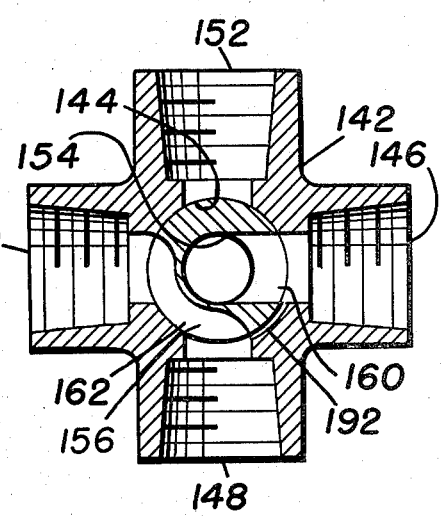
FIG. 5 is a sectional view taken along the line V—V of FIG. 4.

In the case wherein, for example, the vehicle is operating normally with valve element 156 in the position shown in FIG. 5, upon engine failure, pressure will no longer be maintained in line 134. Rather, pressure will be released therefrom and from brakes 130, so that brakes 130 are then in a spring-applied state. In may then be desirable to tow the inoperative vehicle to a place wherein it can be conveniently repaired.

Figure 8:
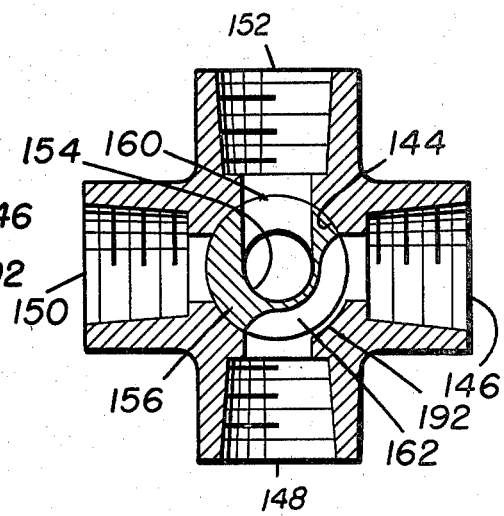
FIG. 8 is a view similar to that shown in FIGS. 5-7, with the valve in yet another operating mode.

In such case, the valve element is moved to the position shown in FIG. 8, moving the portion 8 into the position of the original portion 5. Valve element 156 thereupon provides communication between port 146 and port 148, and also between port 154 and port 152, with port 150 being blocked. Movement of the pump lever 174 in a rightward direction moves piston 170 rightward to draw fluid into pump 166 from lines 134 and 136 and into the cylinder head past check valve 186. Subsequent movement of pump actuating lever 174 in a leftward direction forces the fluid in the cylinder head, past check valve 182, through line 180, into port 148, then through valve element 156 and out port 146 into line 133, so that fluid pressure is applied to lines 131 and to brakes 130. Fluid pressure buildup is maintained in lines 132 because line 138 is blocked at port 150. Continued back-and-forth movement of actuating lever 172 will provide a repetition of this step to build up fluid pressure applied to brakes 130 until such pressure is sufficient to release brakes 130. The vehicle may then be towed as appropriate to a place wherein repairs can be undertaken. Relief valve 190 limits the manually pumped fluid pressure in the brakes to protect the brakes against excessive pressure. Limit switch 200 insures that with valve element 156 in this stage, the vehicle engine cannot be started because lobe 208 of cam surface 206 is in contact with roller 204 of limit switch 200, insuring that the limit switch 200 is in an open position.

It should be noted in FIGS. 3 and 4 that pins 194 and 196 are secured to valve body 142, and positioned to be contacted by nose portion 198 of the handle 158, so that valve element 156 cannot be moved directly from the position just described (i.e. FIG. 8) to the normal operating position shown in FIG. 5. If this movement could be undertaken, it is possible that pressurized fluid could be trapped in the line while limit switch 200 could be closed to again allow starting of the engine. Such pressure of trapped oil might be sufficient to prevent brake application during initial start-up operation of the vehicle, leading to a hazardous situation. By placement of the pins as shown, the handle must be moved back through the stages shown in FIG. 7 and FIG. 6, to that shown in FIG. 5. With valve element 156 as shown in FIG. 7, it will be remembered that the line 133 is in communication with the transmission reservoir through valve element 156, insuring that fluid pressure is released from brakes 130. Thus, the problem of possible trapping of pressurized fluid described above is avoided.

Other aspects, objects and advantages of this invention can be obtained from a study of the drawings, the disclosure, and the appended claims.

We claim:

1. In a braking system having a normally spring applied, fluid pressure releasable brake (10), a fluid pressure supply line (22), a brake pressure line (12), a fluid reservoir line (30), and a manual pump (28) having an inlet passage (46) and an outlet passage (48), the improvement comprising:
    multiple position connection means (14) for selectively communicating the brake pressure line (12) with the fluid pressure supply line (22) or with the manual pump outlet (48), and the fluid pressure supply line (22) with the fluid reservoir line (30), the multiple position connection means (14) including:
    a first port (20) in communication with the fluid pressure supply line (22);
    a second port (16) in communication with the brake pressure line (12);
    a third port (18) in communication with the manual pump outlet passage (48); and
    means (120) for selectively communicating the first port (20) with the second port (16) to communicate fluid supply line pressure to the brake (10) for normal operation thereof, for communicating the third port (18) with the second port (16) to selectively manually pressurize the brake (10), and for communicating the first port (20) with the third port (18) to check the fluid supply line pressure.

2. The improvement set forth in claim 1 wherein the manual pump (28) includes a housing (34) having the inlet (46) and the outlet (48) passages formed therein, the housing (34) further including:
    a cross bore (50) communicating with the inlet (46) and the outlet (48) passages;
    a pump cylinder (36);
    a piston (38) reciprocally positioned within the pump cylinder (36);
    a passageway (44) communicating the pump cylinder (36) with the inlet (46) and the outlet (48) passages and with the cross bore (50); and
    a check valve (52, 54) disposed in the cross bore (50) and the outlet passage (48) respectively.

3. The improvement set forth in claim 2 wherein the inlet passage (46) is in communication with the fluid reservoir line (30).

4. The improvement set forth in claim 3 wherein the manual pump (28) further includes a pressure relief valve (76) disposed intermediate the inlet (46) and the outlet (48) passages to limit the manual pump outlet pressure.

5. The improvement set forth in claim 4 wherein the manual pump (28) further includes pressure release means (88) for releasing fluid pressure from the brake (10) to the fluid reservoir line (30).

6. The improvement set forth in claim 5 wherein the braking system includes a brake bleed line (112) and the multiple position connection means (14) further includes a fourth port (108) in communication with the brake bleed line (112).

7. The improvement set forth in claim 6 wherein the multiple position connection means (14) includes a terminal board (14) having the first, second, third and fourth ports (20, 16, 18, 108) formed therein.

8. The improvement set forth in claim 7 wherein the selective communicating means (120) is a tube (120) adapted for connection to any two of the first, second, or third ports (20, 16, 18).

9. The improvement set forth in claim 1 wherein the braking system includes a brake bleed line (112) and the multiple position connection means (14) further includes a fourth port (108) in communication with the brake bleed line (112).

10. The improvement set forth in claim 9 wherein the multiple position connection means (14) includes a terminal board (14) having the first, second, third and fourth ports (20, 16, 18, 108) formed therein.

11. The improvement set forth in claim 10 wherein the selective communicating means (120) is a tube (120) adapted for connection to any two of the first, second, or third ports (20, 16, 18).

12. The improvement set forth in claim 11 wherein the manual pump (28) includes a housing (34) having the inlet (46) and the outlet (48) passages formed therein, the housing (34) further including:
    a cross bore (50) communicating with the inlet (46) and the outlet (48) passages;
    a pump cylinder (36);
    a piston (38) reciprocally positioned within the pump cylinder (36);
    a passageway (44) communicating the pump cylinder (36) with the inlet (46) and the outlet (48) passages and with the cross bore (50); and
    a check valve (52, 54) disposed in the cross bore (50) and the outlet passage (48) respectively.

13. The improvement set forth in claim 12 wherein the inlet passage (46) is in communication with the fluid reservoir line (30).

14. The improvement set forth in claim 13 wherein the manual pump (28) further includes a pressure relief valve (76) disposed intermediate the inlet (46) and the outlet (48) passages to limit the manual pump outlet pressure.

15. The improvement set forth in claim 14 wherein the manual pump (28) further includes pressure release means (88) for releasing fluid pressure from the brake (10) to the fluid reservoir line (30).

16. In a vehicle having a normally spring applied, fluid pressure releasable brake (130), a brake pressure line (133), a brake exhaust line (138), a fluid pressure supply line (134), a fluid reservoir return line (136), a manual pump (166) having an inlet line (184) communicating with the fluid reservoir line (136) and an outlet line (180), the improvement comprising:
- a valve (140) including:
  - a first port (154) in communication with the fluid pressure supply line (134);
  - a second port (146) in communication with the brake pressure line (133);
  - a third port (148) in communication with the manual pump outlet line (180);
  - a fourth port (150) in communication with the brake exhaust line (138);
  - a fifth port (152) in communication with the fluid reservoir return line (136);
  - a restrictive orifice (192) communicating the second (146) and third (148) ports; and
  - a valve element (156) selectively movable between first (5), second (8), and third (6) positions, the valve element (156) including means (160, 162) for communicating the first port (154) with the second port (146) and the third port (148) with the fourth port (150) for communication of fluid supply line pressure to the brake (130) for normal operation thereof when the valve element (156) is in said first position (5), for communicating the first port (154) with the fifth port (152) and the third port (148) with the second port (146) for manual pressurization of the brakes (130) when the valve element (156) is in said second position (8), and for communicating the first port (154) with the third port (148) and the fourth port (150) with the fifth port (152) for bleeding of the brakes (130) when the valve element (156) is in said third position (6).

17. The improvement set forth in claim 16 wherein said valve element (156) is movable to a fourth position (7) wherein said means (160, 162) for communicating communicates the first port (154) with the fourth port (150) and the second port (146) with the fifth port (152) and wherein a check valve (164) is disposed in the brake exhaust line (138) for isolation of the system fluid pressure supply communicated to the first pole (154).

18. The improvement set forth in claim 17 wherein said valve (140) has a valve body (142) having a central bore (144), and said first port (154) is an axial port provided axially in said body (142) at one end of the bore (144), and said second, third, fourth and fifth ports (146,148,150,152) are radial outlet ports provided in said body (142) radially outward of the bore (144), and the valve element (156) is a cylindrical element rotatably disposed in said bore (144) and includes an internal angled passage (160) of a structure sufficient to communicate the axial inlet port (154) with one of said radial outlet ports (146,148,150,152), and a relieved peripheral passage (162) of a structure sufficient to communicate two of the other of said radial outlet ports (146,148,150,152).

19. The improvement set forth in claim 18 wherein said valve (140) includes a handle (158) attached to said valve element (156) for selective rotation thereof, said handle (158) including a cam surface (206), and further including a limit switch (200) including a cam following switch arm (202) of a structure sufficient to follow the cam surface (206) as the handle (158) and valve element (156) are rotated, said cam surface (206) and limit switch (200) being of a structure sufficient to actuate the limit switch (200) when the manual pump (166) is communicated to the brake pressure line (133).

20. The improvement set forth in claim 19 further comprising:
- pins (194,196) for preventing rotation of valve element (156) from a position communicating the second port (146) and brake pressure line (133) with the third port (148) and the manual pump (166) when the valve element (156) is in said second position (8), directly to a position communicating the first port (154) when the valve element (156) is in said first position (5) without first communicating the second port (146) with the fifth port (152) and the reservoir return line (136) in said fourth valve element position (7).

* * * * *